United States Patent
Caraghiorghiopol et al.

(10) Patent No.: US 7,969,043 B2
(45) Date of Patent: Jun. 28, 2011

(54) POWER MANAGEMENT SYSTEMS WITH MULTIPLE POWER SOURCES

(75) Inventors: Eftimie Caraghiorghiopol, San Jose, CA (US); Constantin Spiridon, San Jose, CA (US); Tzu-Ching Yang, Santa Clara, CA (US)

(73) Assignee: O2 Micro, Inc., Santa Clara, CA (US)

( * ) Notice: Subject to any disclaimer, the term of this patent is extended or adjusted under 35 U.S.C. 154(b) by 141 days.

(21) Appl. No.: 12/290,723

(22) Filed: Nov. 3, 2008

(65) Prior Publication Data
US 2009/0115252 A1    May 7, 2009

Related U.S. Application Data

(60) Provisional application No. 61/001,824, filed on Nov. 5, 2007.

(51) Int. Cl.
*H02J 1/00* (2006.01)
(52) U.S. Cl. ......................................................... 307/82
(58) Field of Classification Search ...................... 307/82
See application file for complete search history.

(56) References Cited

U.S. PATENT DOCUMENTS

| | | | | |
|---|---|---|---|---|
| 4,877,972 | A * | 10/1989 | Sobhani et al. | 307/43 |
| 7,262,520 | B2 * | 8/2007 | Nguyen et al. | 307/86 |
| 7,615,965 | B2 | 11/2009 | Popescu-Stanesti | |
| 7,656,059 | B2 * | 2/2010 | Wang et al. | 307/82 |
| 7,808,548 | B1 | 10/2010 | Popescu-Stanseti | |
| 2007/0046250 | A1 | 3/2007 | Freiman et al. | |

FOREIGN PATENT DOCUMENTS

| | | |
|---|---|---|
| CN | 1690896 A | 11/2005 |
| CN | 2867690 Y | 2/2007 |

OTHER PUBLICATIONS

Translation of Office Action received in Chinese Application No. 200810172640.5 dated Apr. 10, 2010 (7 pages).
Translation of Second Office Action on Chinese Patent Application for Invention No. 200810172640.5 dated Jan. 17, 2011 (7 pages).

* cited by examiner

*Primary Examiner* — Robert L. Deberadinis

(57) ABSTRACT

An electronic system includes a plurality of primary power sources operable for powering a load and charging a secondary power source, and a power management unit coupled to the plurality of primary power sources and the secondary power source. The power management unit is operable for selectively directing power of each of the primary power sources to the load according to a power requirement of the load. The power management unit is further operable for directing power of the secondary power source to the load if the power requirement of the load exceeds a total power capacity of the plurality of primary power sources.

4 Claims, 6 Drawing Sheets

POWER MANAGEMENT SYSTEMS WITH MULTIPLE POWER SOURCES

RELATED APPLICATIONS

This application claims priority to U.S. Provisional Application No. 61/001,824, filed on Nov. 5, 2007, which is hereby incorporated by reference in its entirety.

TECHNICAL FIELD

Embodiments in accordance with the present invention relate to power management systems.

BACKGROUND

An electronic system can be powered by multiple power supplies, such as a primary power source and a secondary power source. Usually, there is a power management device managing the operation of these multiple power sources. Conventionally, the primary power source may be a power source such as a fuel cell (or an AC/DC adapter) having a limited output power capacity. The secondary power source may be a rechargeable battery pack such as a lithium-ion battery pack. Generally, power supply to the system can be provided by the fuel cell and backed up by the lithium-ion battery pack. If the load of the system is heavy, power demand of the system may exceed the output capacity of the fuel cell. To provide enough power to a system with a heavy load, the power management device may instruct the fuel cell and the lithium-ion battery pack to discharge simultaneously.

The above-mentioned power management device has several drawbacks. The power demand of a system with heavy load may exceed the output power capacity of the fuel cell frequently. Accordingly, the lithium-ion battery pack discharges frequently so as to provide enough power to the system. Frequent discharging of a lithium-ion battery pack may shorten the lithium-ion battery life. Moreover, as the power demand of the system increases, the output power delivered by the lithium-ion battery increases as well. Since the lithium-ion battery pack usually has a limited battery capacity, the energy stored in the lithium-ion battery pack may be exhausted quickly to power a relatively heavy load, which can affect the performance of the system.

To prevent the lithium-ion battery pack from discharging, a primary power source which has a large output power capacity can be used in a conventional power management device. However, the introduction of a primary power source having a larger output power capacity may not only result in more heat dissipation but also increase the system cost.

SUMMARY

According to one embodiment of the invention, an electronic system includes a plurality of primary power sources operable for charging a secondary power source, and a power management unit coupled to the primary power sources and the secondary power source. The power management unit is operable for selectively directing power of each of the primary power sources to a load according to a power requirement of the load. The power management unit is further operable for directing power of the secondary power source to the load if the power requirement of the load exceeds a total power capacity of the plurality of primary power sources.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Reference will now be made in detail to the embodiments of the present invention. While the invention will be described in conjunction with these embodiments, it will be understood that they are not intended to limit the invention to these embodiments. Additional advantages and aspects of the present disclosure will become readily apparent to those skilled in the art from the following detailed description. As will be described, the present disclosure is capable of modification in various obvious respects, all without departing from the spirit of the present disclosure. Accordingly, the drawings and description are to be regarded as illustrative in nature, and not as limitative.

Figure 1:
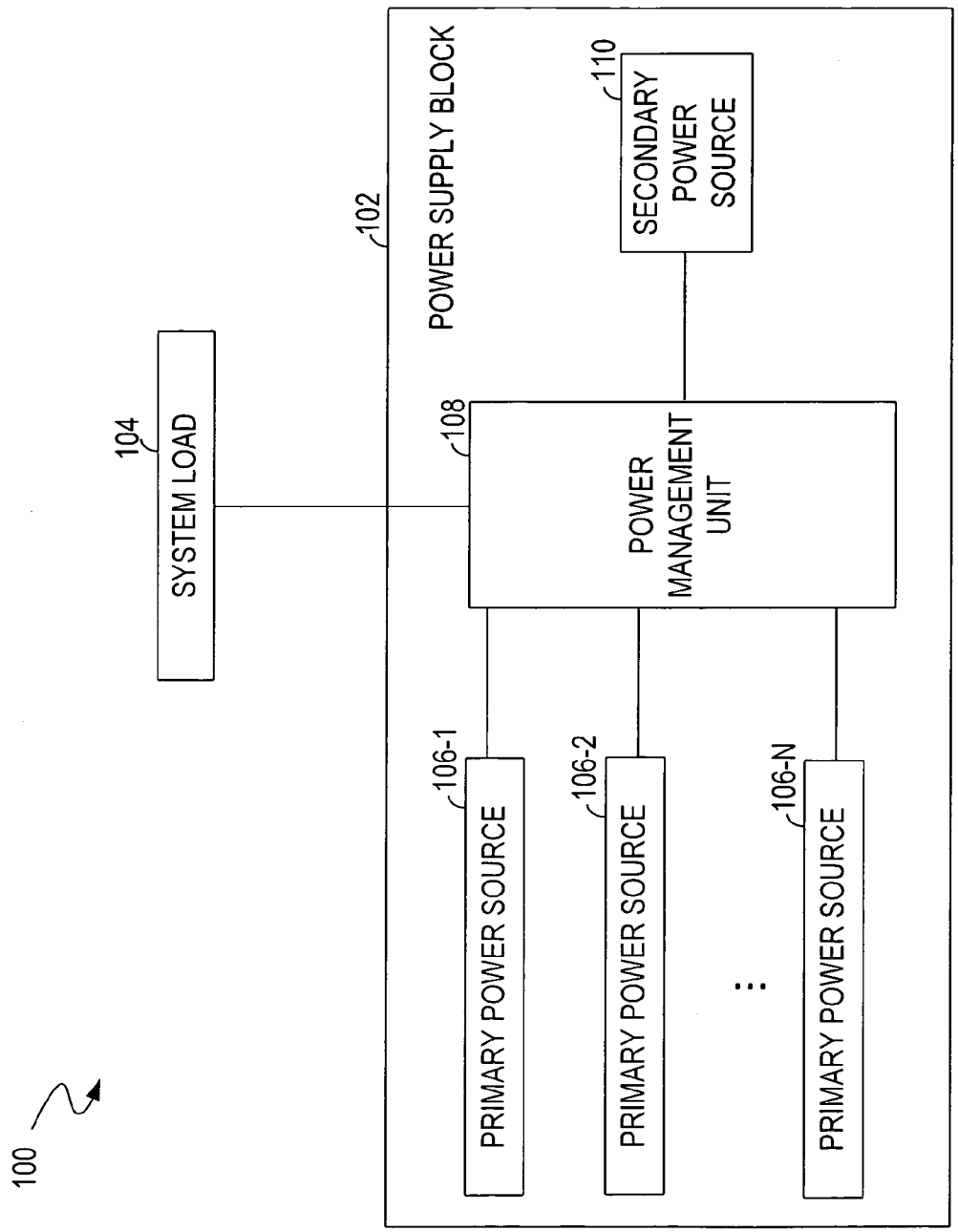
FIG. 1 illustrates an electronic system powered by a plurality of primary power sources and a secondary power source, in accordance with one embodiment of the present invention.

Referring to FIG. 1, an exemplary electronic system 100 can include a power supply block 102 and a system load 104. In one embodiment, the system load 104 can be, but is not limited to, a computer with a processing unit, a display unit with a backlight and an input/output unit, for performing a variety of functions (e.g. processing data, playing back video and music, etc.). The system load 104 may also be other types of electric devices, such as electric tools, power light emitting diodes (LEDs), etc.

As shown in FIG. 1, the power supply block 102 can include a plurality of primary power sources 106-1~106-N (not all the primary power sources are shown in FIG. 1 for purposes of brevity and clarity), a secondary power source 110, and a power management unit (PMU) 108. Each of the primary power sources 106-1~106-N can include, but is not limited to, a power converter (e.g., an output controllable AC/DC converter or an output controllable DC/DC converter), a fuel cell, or other alternative energy storage elements. In one embodiment, the secondary power source 110 can include, but is not limited to, a battery pack, e.g., a lithium-ion battery pack, a NiMH battery pack or the like. In operation, the PMU 108 monitors a power requirement of the system load 104 and supplies power to the system load 104 according to its power requirement.

In one embodiment, the system load 104 is powered by one or more primary power sources 106-1~106-N. The PMU 108 can selectively direct power of each of the primary power sources 106-1~106-N to the system load 104 according to the power requirement of the system load 104. In other words, the PMU 108 can enable/control one or more primary power sources 106-1~106-N simultaneously depending on the power requirement of the system load 104 so as to power the system load 104. The PMU 108 is also able to adjust power of each of the primary power sources 106-1~106-N to meet the power requirement of the system load 104. If the power requirement of the system load 104 exceeds the total power capacity of the primary power sources 106-1~106-N, the PMU 108 can further direct power of the secondary power source 110 to the system load 104 thereby frees the system load 104 from power interruptions.

Besides providing power to the system load 104, the primary power sources 106-1~106-N can also provide power to charge the secondary power source 110. The primary power sources 106-1~106-N can charge the secondary power source 110 and power the system load 104 simultaneously, in one embodiment. In another embodiment, the primary power sources 106-1~106-N can charge the secondary power source 110 or power the system load 104. In one embodiment, the secondary power source 110 is a rechargeable power source, and the PMU 108 is operable for selectively directing power of each of the primary power sources 106-1~106-N to charge the secondary power source 110. The PMU 108 is also operable for adjusting the power of each of the primary power sources 106-1~106-N so as to meet the charging power requirement (e.g., a charging current requirement and/or a charging voltage requirement) of the secondary power source 110.

Figure 2:
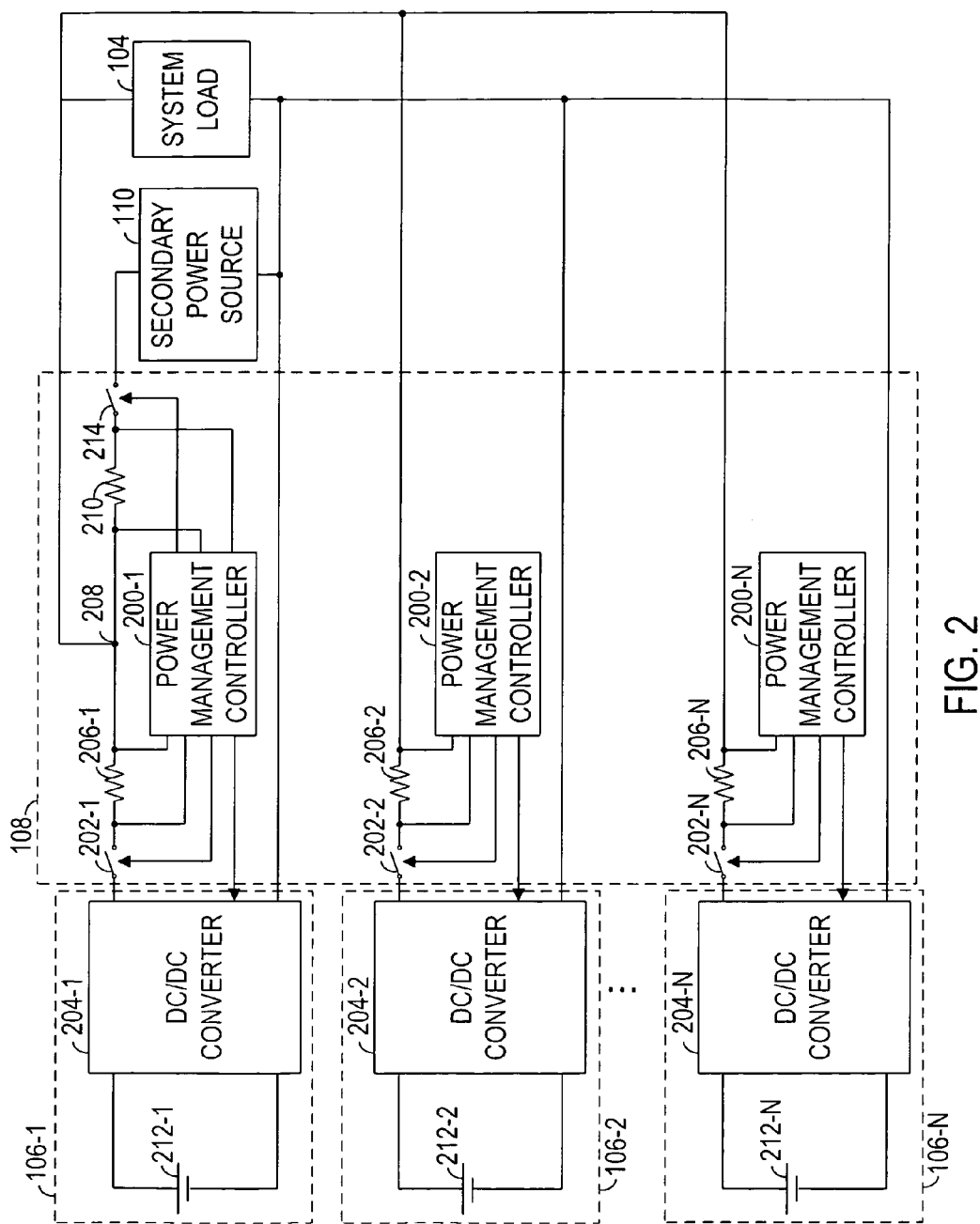
FIG. 2 illustrates an exemplary block diagram of a power management topology, in accordance with one embodiment of the present invention.

Referring to FIG. 2, an exemplary block diagram of the PMU 108 is illustrated, according to one embodiment of the present invention. In addition, the primary power sources 106-1~106-N, the secondary power source 110 and the system load 104 are also illustrated in FIG. 2. In the example of FIG. 2, each of the primary power sources 106-1~106-N can include a DC power supply, e.g., fuel cells 212-1~212-N, coupled to a corresponding power converter, e.g., DC/DC converters 204-1~204-N. Not all the fuel cells and all the DC/DC converters are shown in FIG. 2 for purposes of brevity and clarity. The secondary power source 110 can be a lithium-ion battery pack having multiple lithium-ion battery cells (individual cells are not shown in FIG. 2 for purposes of brevity and clarity). The primary power sources 106-1~106-N and the secondary power source 110 are not limited to fuel cells and lithium-ion battery packs, other types of power sources such as AC/DC converter, lead-acid battery packs may also be employed. For example, each of the primary power sources 106-1~106-N can include an AC/DC converter.

To provide a controllable output power to the system load 104, DC/DC converters 204-1~204-N (e.g., boost/buck DC/DC converters) are coupled to the fuel cells 212-1~212-N for adjusting power of the primary power sources 106-1~106-N respectively, in one embodiment. For example, by using the DC/DC converter 204-1, power generated by the fuel cell 212-1 can be converted to an output having a desirable/predetermined level (e.g., predetermined current/voltage/power level).

In one embodiment, the PMU 108 includes multiple power management controllers 200-1~200-N (not all the power management controllers are shown in FIG. 2 for purposes of brevity and clarity) coupled to the primary power sources 106-1~106-N respectively. Each of the power management controllers 200-1~200-N is operable for selectively directing power of a corresponding primary power source 106-1~106-N to the system load 104. In one embodiment, the PMU 108 is operable for adjusting power of each of the primary power sources 106-1~106-N by the power management controllers 200-1~200-N. Each power management controller 200-1~200-N can control a corresponding DC/DC converter 204-1~204-N so as to adjust the power of a corresponding primary power source 106-1~106-N.

In addition, the PMU 108 can control charging and discharging of the secondary power source 110. For example, in FIG. 2, the power management controller 200-1 controls the power supply from the fuel cell 212-1 to the system load 104 as well as charging and discharging of the secondary power source 110. However, charging and discharging of the secondary power source 110 can also be controlled by other power management controllers 200-2~200-N, in other embodiments.

In one embodiment, the PMU 108 monitors the power requirement of the system load 104 and controls power to the system load 104 according to the power requirement of the system load 104. In one embodiment, power management controllers 200-1~200-N employ measurement components (e.g., sense resistors) to monitor currents and/or power generated by the primary power sources 106-1~106-N. Similarly, the charging or discharging current of the secondary power source 110 can also be monitored by a sense resistor. As illustrated in FIG. 2, sense resistors 206-1~206-N (not all the sense resistors are shown in FIG. 2 for purposes of clarity and brevity) are coupled to the primary power sources 106-1~106-N for monitoring output currents and/or power of the primary power sources 106-1~106-N respectively. In addition, a sense resistor 210 is coupled to the secondary power source 110 for monitoring a charging current and a discharging current of the secondary power source 110. More specifically, the discharging current flowing from each fuel cell 212-1~212-N can be calculated by measuring a voltage across a corresponding sense resistor 206-1~206N by a corresponding power management controller 200-1~200-N. In addition, the sense resistor 210 can be coupled in parallel to the power management controller 200-1. Charging and/or discharging current of the secondary power source 110 can thus be monitored by the power management controller 200-1 via the sense resistor 210.

Furthermore, each of the power management controllers 200-1~200-N can include terminals (not shown in FIG. 2 for purposes of brevity and clarity) that receive control/monitoring signals from other devices (e.g. a CPU) or output other control signals. For example, each of the power management controllers 200-1~200-N can provide a charging current monitoring signal indicating the charging current of the secondary power source 110. Moreover, each of the power management controllers 200-1~200-N can further receive a control signal which indicates the number of battery cells of the secondary power source 110.

In one embodiment, based on the aforementioned monitoring/control signals, PMU 108 generates control signals to control the ON/OFF states of switches 202-1~202-N and switch 214. By controlling the ON/OFF states of switches 202-1~202-N and switch 214, power generated by fuel cells 212-1~212-N and/or the secondary power source 110 can be selectively directed to the system load 104 according to the power requirement of the system load 104. Additionally, power management controllers 200-1~200-N are also capable of adjusting the output currents (or voltages, power) of the DC/DC converters 204-1~204-N. Consequently, power supply to the system load 104 can be further adjusted by controlling DC/DC converters 204-1~204-N after the ON/OFF states of the switches 202-1~202-N and switch 214 are determined.

In one embodiment, power management controllers 200-1~200-N can, at the beginning, turn switch 202-1 on and adjust an output (e.g., output current, output voltage, or output power) of the DC/DC converter 204-1 if the power requirement of the system load 104 varies within the maximum output power of the fuel cell 212-1. With the increase of the system power requirement, power management controllers 200-2~200-N may sequentially turn switches 202-2~202-N on so as to meet the power requirement of the system load 104. Furthermore, the PMU 108 can dynamically adjust the output of the DC/DC converters 204-1~204-N, which allows the secondary power source 110 to be charged in different charging phases/modes, e.g., constant current charging, constant voltage charging, in one embodiment. Therefore, the primary power sources 106-1~106-N can be controlled/adjusted according to the power requirement of the system load 104 and the charging power requirement of the secondary power source 110.

If the power requirement of the system load 104 exceeds the total power capacity of all the fuel cells 212-1~212-N, power management controllers 200-1~200-N can turn all the switches 202-1~202-N and switch 214 on. As such, the fuel cells 212-1~212-N and the secondary power source 110 supply power to the system load 104 simultaneously.

As discussed above, the primary power sources 106-1~106-N can be sequentially switched on according to the power requirement of the system load 104 and the charging power requirement of the secondary power source 110. However, in another embodiment, instead of sequentially switching on the switches 202-2~202-N, all the switches 202-2~202-N can be switched on simultaneously at the beginning so as to allow all the primary power sources 106-1~106-N to power the system load 104 and/or charge the secondary power source 110. Therefore, each primary power source 106-1~106-N can output substantially the same amount of power. In this embodiment, each power management controller 200-1~200-N can be coupled to the sense resistor 210 and can monitor the charging and/or discharging current of the secondary power source 110.

Advantageously, the secondary power source 110 can be prevented from discharging frequently by using a plurality of primary power sources 106-1~106-N which have a relatively large output power capacity. In one embodiment, a desired output power capacity of the primary power sources 106-1~106-N can be obtained by properly choosing the number of primary power sources used to power the system load 104. Thus, if the number of primary power sources (N) is properly chosen, the secondary power source 110 can be free from discharging if the power demand of the system load 104 is within the total output power capacity of the primary power sources 106-1~106-N, in one embodiment. For example, if N is three and each primary power source has an output power capacity of 25 watts, the secondary power source 110 can be prevented from discharging until the power demand of the system load exceeds 75 watts. Thus, the discharging frequency of the secondary power source 110 can be reduced, which can increase the life of the secondary power source 110 and enhance the performance of the system load 104.

Moreover, since the current flowing through each DC/DC converter, switch and sense resistor can be controlled within a certain level, the requirement for components that can work under high voltage/current condition may not be necessary, in one embodiment. In addition, one or all of the power management controllers 200-1~200-N can monitor a current of the secondary power source 110 via a single sense resistor 210, in one embodiment. Therefore, the cost for power management can be saved.

The heat generated by a certain component (e.g. a resistor) can be in proportional to the square of the current which flows through it. In one embodiment, the maximum output power of each primary power source 106-1~106-N can be limited to 1/N of the maximum output power of a conventional primary power source having the same output power as the total output power of the primary power sources 106-1~106-N. Therefore, the heat generated by the power supply block 102 can be reduced.

In one embodiment, the charging current and voltage of the secondary power source 110 can be controlled/adjusted by one or more power management controllers 200-1~200-N. Therefore, the power supply block 102 as shown in FIG. 1 can be flexible to accommodate secondary power source with different battery cell chemistries and cell numbers.

The PMU 108 can be implemented in different configurations. For example, power management controllers 200-1~200-N can be either implemented as individual integrated circuits (ICs) or integrated on a single IC. For example, each power management controller may include a chip OZ8758 designed by O2Micro International Limited. Alternatively, other ICs provided by other manufacturers may also be used to implement the embodiments described herein.

Figure 3:
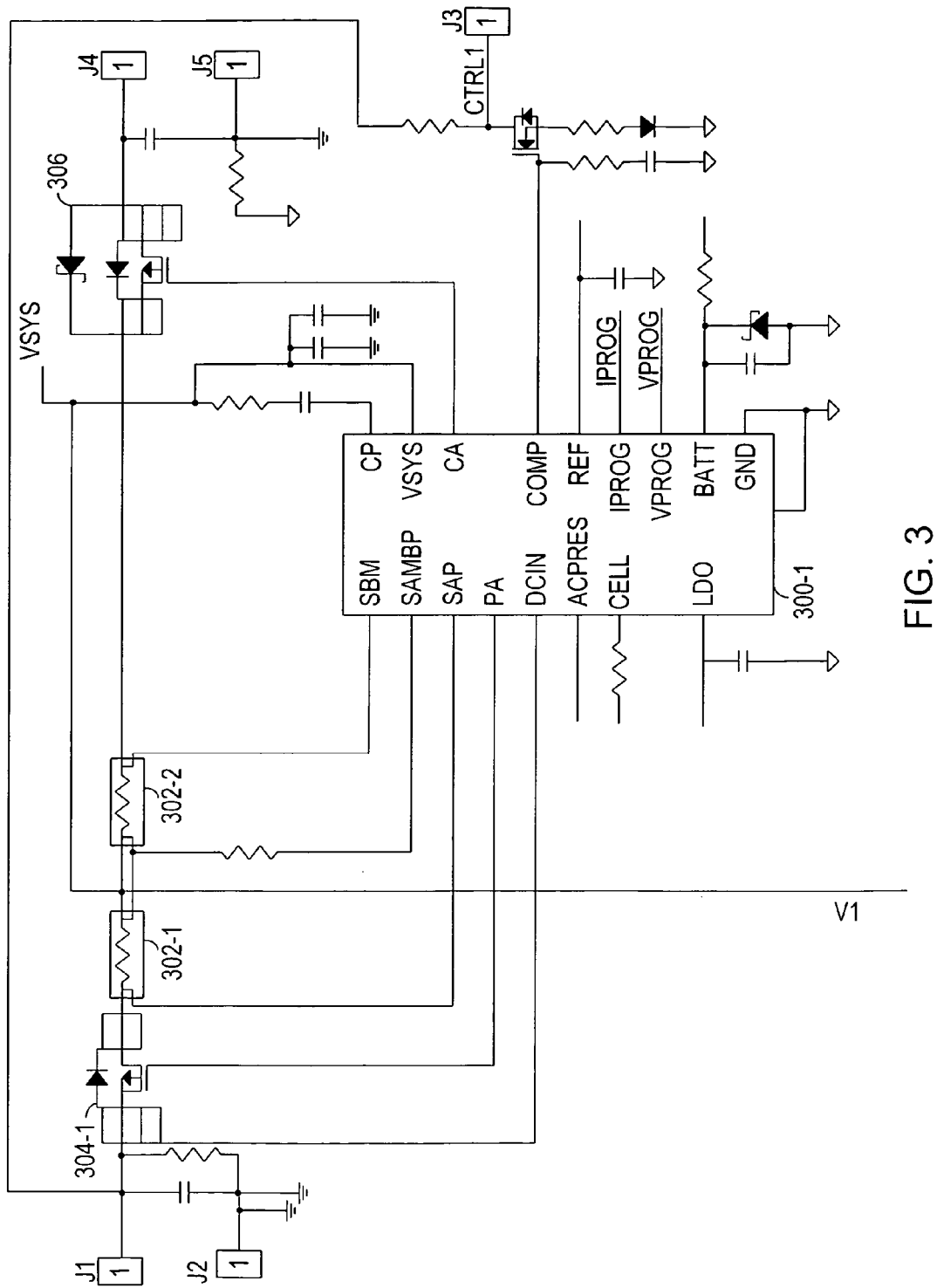
FIG. 3 illustrates an exemplary circuit schematic of the power management topology illustrated in FIG. 2, in accordance with one embodiment of the present invention.
Figure 3:
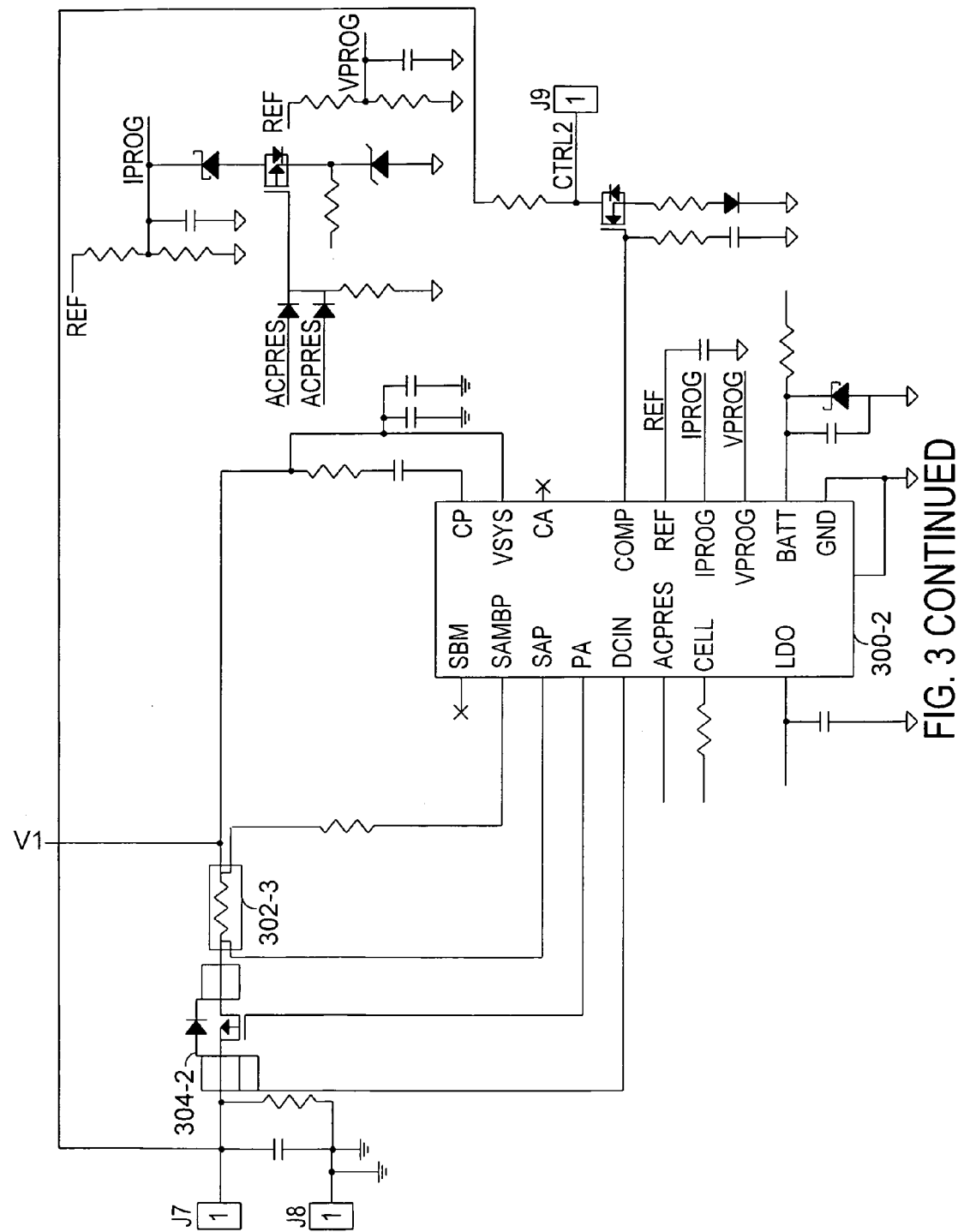

FIG. 3 illustrates an exemplary implementation of the PMU 108, according to one embodiment of the present invention. The PMU 108 illustrated herein can include two power management controllers, e.g., OZ8758 chips numbered 300-1 and 300-2 herein. FIG. 3 is described in combination with FIG. 2. The PMU 108 is capable of controlling power generated by two primary power sources 106-1 and 106-2 (not shown in FIG. 3) respectively, and controlling power generated by the secondary power source 110 (not shown in FIG. 3) which includes a lithium-ion battery pack (e.g., a 4-cell lithium-ion battery pack). The primary power source 106-1 includes a fuel cell 212-1. The primary power source 106-2 includes a fuel cell 212-2. Outputs from fuel cells 212-1, 212-2 and the secondary power source 110 are respectively coupled to the system load 104 via jacks J1, J7 and J4. A current flowing through the sense resistor 302-1 indicating an output current of the fuel cell 212-1, and a current flowing through the sense resistor 302-2 indicating a charging/discharging current of the secondary power source 110 can be monitored by terminals SAP, SAMBP and SBM of the first controller 300-1. A current flowing through the sense resistor 302-3 indicating an output current of the fuel cell 212-2 can be monitored by terminals SAP and SAMBP of the second controller 300-2. In the example of FIG. 3, the second controller 300-2 does not monitor the current flowing through the sense resistor 302-2 indicating the charging/discharging current of the secondary power source 110. However, in an alternate embodiment, the current flowing through the sense resistor 302-2 can be monitored by terminals SBM and SAMBP of the second controller 300-2. Each controller can include input terminals receiving control signals from other devices (e.g. a CPU or a MCU). Particularly, the charging current (voltage) of the secondary power source 110 can be set/controlled by a signal received through an input terminal IPROG (VPROG) of the controller 300-1. Each controller also comprises an input terminal CELL which receives a signal that indicates the cell numbers of the secondary power source 110. Advantageously, each controller can adjust the charging current according to the cell numbers of the secondary power source 110. Each controller further has two switch control terminals PA and CA. For example, switch control terminal PA of the first controller 300-1 can generate a signal to control the ON/OFF states of a switch 304-1 coupled between the fuel cell 212-1 and the system load 104, thereby controlling (e.g., enabling or disabling) power from the fuel cell 212-1 to the system load 104. Switch control terminal CA of the first controller 300-1 can generate a signal to control a switch 306 (e.g., by switching on or switch off the switch 306), thereby controlling charging/discharging of the secondary power source 110. The CA terminal of the second controller 300-2 can be idled since a single secondary power source 110 is employed in the example of FIG. 3. However, if an additional secondary power source is employed, the CA terminal of the second controller 300-2 can be used to control the additional secondary power source.

Based on the detected current and control signals received through the aforementioned terminals, controller 300-1 and 300-2 can generate DC/DC control signals at their COMP terminals and send these control signals to respectively adjust outputs (e.g., output current, output voltage, and/or output power) of DC/DC converters 204-1 and 204-2 (not shown) via jacks J3 and J9.

In one embodiment, an input pin DCIN of the controller 300-1 or 300-2 receives a signal indicating the level of the input voltage/power, an input pin ACPRES receives a signal indicating the presence of the corresponding primary power source, an output pin LDO outputs a DC signal, an output pin REF outputs a DC reference signal, and an input pin BATT receives an input from the secondary power source 110.

Figure 4:
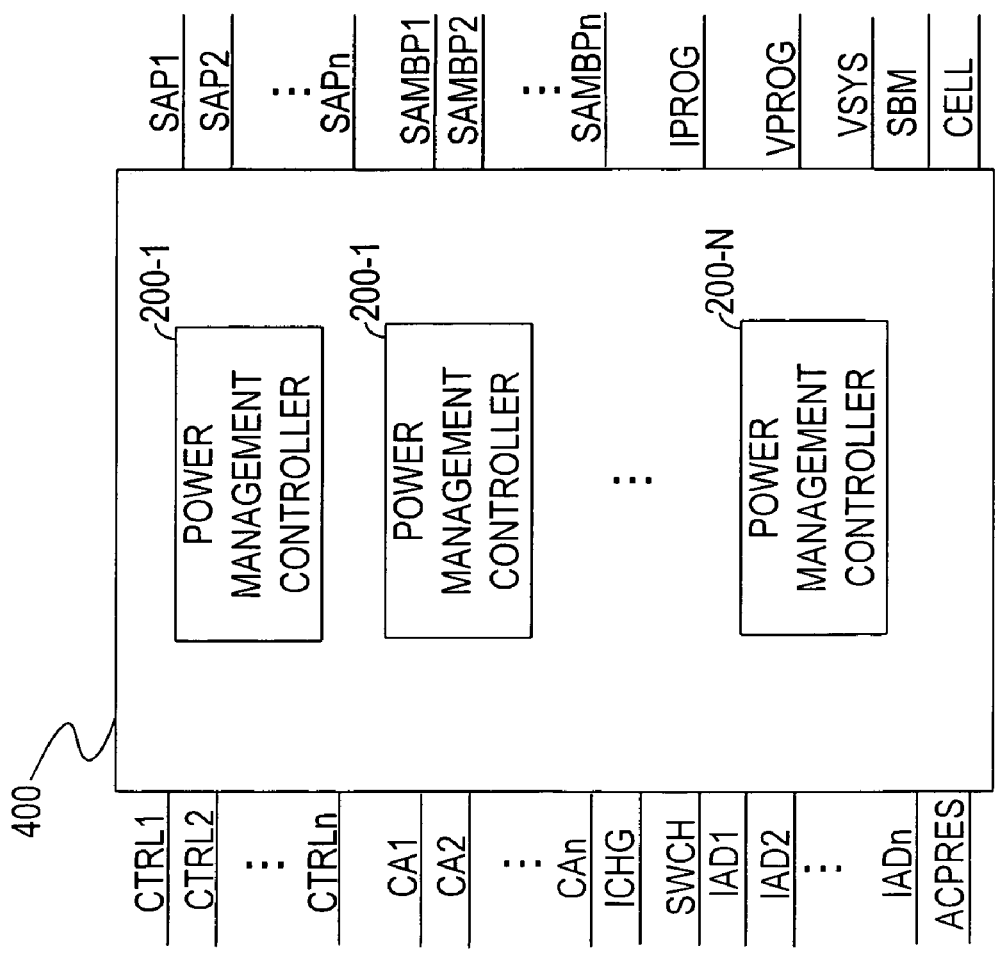
FIG. 4 illustrates an exemplary block diagram of a power management topology, in accordance with one embodiment of the present invention.

FIG. 4 illustrates an exemplary block diagram of the power management controllers 200-1~200-N which are implemented on a single IC 400, according to one embodiment of the present invention. FIG. 4 is described in combination with FIG. 2 and FIG. 3. In one embodiment, power management controllers 200-1~200-N can be manufactured on a single semiconductor substrate (e.g. silicon substrate). The input and output terminals of each power management controller are routed to pins of the package, in which the IC 400 is packed. In one embodiment, the IC 400 can have input pins SAP1~SAPn, SAMBP1~SAMBPn, SBM, IPROG, VPROG, VSYS and CELL (not all the input pins are shown in FIG. 4 for purposes of brevity and clarity). Pins SAP1~SAPn, SAMBP1~SAMBPn and SBM can be current input pins respectively coupled to sense resistors 206-1~206-N and sense resistor 210 for receiving monitored current information. For example, power management controller 200-1 senses current flowing through resistor 206-1 via SAP1 and SBM. To amplify the received current information, a plurality of internal amplifiers (not shown in FIG. 4 for purposes of brevity and clarity) which are associated to pins SBM and SAMBP1~SAMBPn can also be integrated in IC 400. Pin IPROG can receive a signal that determines a predetermined/desired charging current of the secondary power source 110. Pin VPROG can receive a signal that determines a predetermined/desired charging voltage of the secondary power source 110. Pin VSYS can receive a signal that indicates a system voltage level. Pin CELL can receive a signal that indicates the number of battery cells in the secondary power source 110.

The IC 400 can further include output pins CTRL1~CTRLn, CA1~CAn, SWCH, IAD1~IADn, ICHG and ACPRES (not all the output pins are shown in FIG. 4 for purposes of brevity and clarity). Pins CTRL1~CTRLn can output DC/DC control signals to control DC/DC converters 204-1~204-N, respectively. Pins CA1~CAn can output switch control signals to control switches 202-1~202-N respectively. Pin SWCH can output a switch control signal to control switch 214. Pins IAD1~IADn can output signals which indicate current level of current generated by each fuel cell. Additionally, pin ICHG can be used to provide a signal indicative of the charging current for the secondary power source 110.

In addition, internal control loops (e.g. internal control loops for current control, voltage control and power control), a selection circuit for each internal control loop, a bandgap reference with a trimming block and a current allocation block (which are not shown in FIG. 4 for purposes of brevity and clarity) can also be integrated on IC 400. By using the trimming block, the output voltage of the bandgap reference can be controlled relatively precisely. According to the monitored current information, the current allocation block is operable for allocating current for the system load 104 and the charging current for the secondary power source 110.

By integrating power controllers 200-1~200-N on a single IC 400, the size of the PMU 108 can be saved and performance can be further improved.

Figure 5:
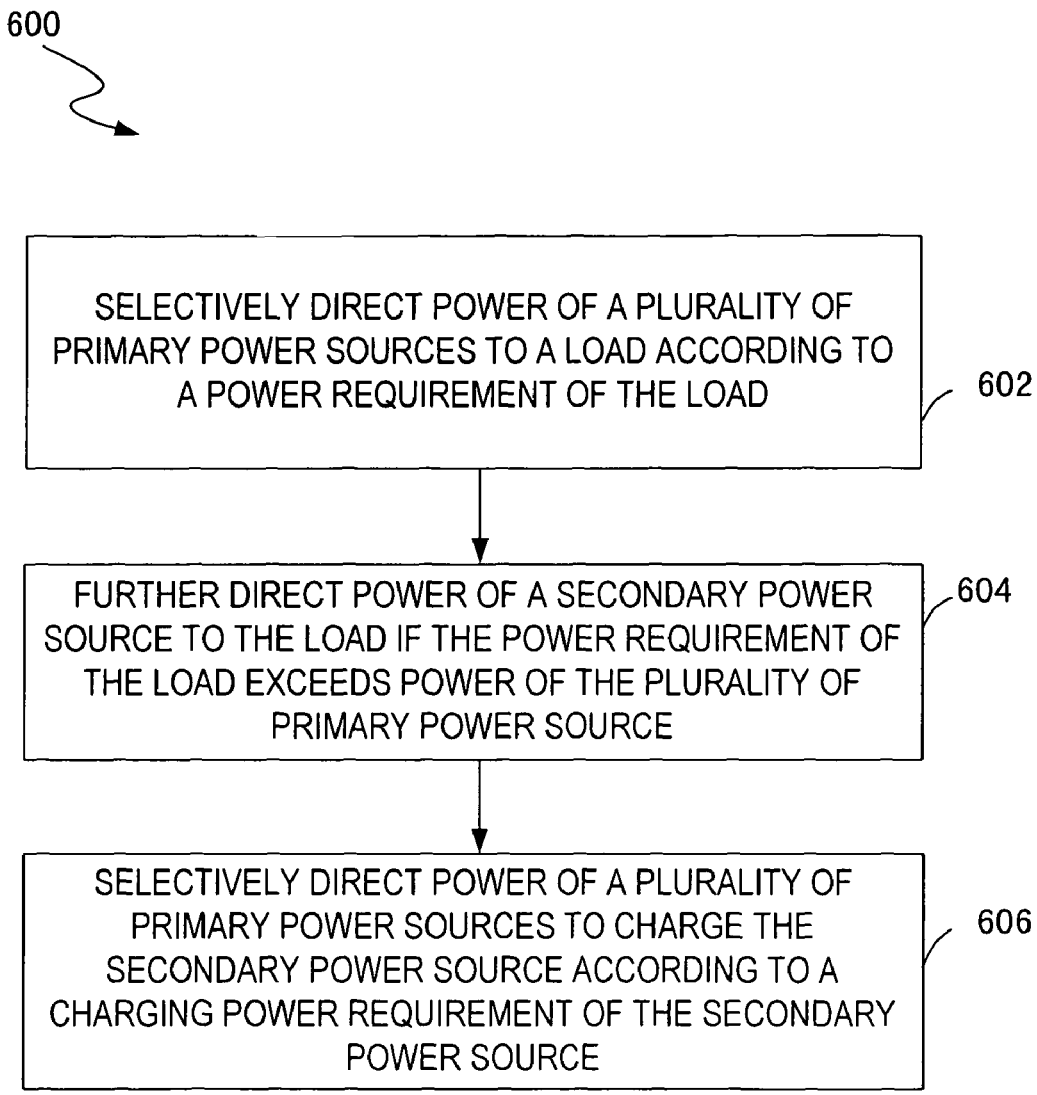
FIG. 5 illustrates a flowchart of a method for managing power of an electronic system, in accordance with one embodiment of the present invention.

FIG. 5 illustrates a flowchart 600 of a method for managing power of an electronic system, in accordance with one embodiment of the present invention. FIG. 5 is described in combination with FIG. 2.

In block 602, power of a plurality of primary power sources 106-1~106-N is selectively directed to a system load 104 according to a power requirement of the system load 104. For example, a first primary power source 106-1 is enabled to power the system load 104. If the power requirement of the system load 104 exceeds the power of the first primary power source 106-1, a second primary power source 106-2 is enabled, and power of the first primary power source 106-1 and the second primary power source 106-2 is directed to the system load 104 simultaneously.

In one embodiment, power of each of the primary power sources 106-1~106-N can be further adjusted by a corresponding power converter under control of a power management unit 108.

In block 604, if the power requirement of the system load exceeds the total output power capacity of the primary power sources 106-1~106-N, a secondary power source 110 is enabled such that the primary power source 106-1~106-N and the secondary power source 110 can power the system load 104 simultaneously.

As discussed in blocks 602 and 604, the power management unit 108 can control the primary power sources 106-1~106-N and the secondary power source 110 to power the system load 104. In one embodiment, the power management unit 108 can also control the primary power sources 106-1~106-N to charge the secondary power source 110. In block 606, power of the primary power sources 106-1~106-N can be selectively directed to the secondary power source 110 to charge the secondary power source 110 according to its charging power requirement.

In one embodiment, power of each of the primary power sources 106-1~106-N can be adjusted by a corresponding power converter under the control of the power management unit 108 to meet the charging power requirement of the secondary power source 110. If the primary power sources 106-1~106-N power the system load 104 and charge the secondary power source 110 simultaneously, the primary power sources 106-1~106-N can be controlled according to both power requirement of the system load 104 and charging power requirement of the secondary power source 110.

Accordingly, embodiments in accordance with the present invention provide an electronic system that can utilize a power management unit to power a system load by controlling a plurality of primary power sources and a secondary power source.

Advantageously, the power management unit is operable for selectively directing power of each of the primary power sources and power of the secondary power source to the system load according to a power requirement of the system load. In operation, if the power requirement of the system load exceeds the total output power capacity of the primary power sources, the power management unit is operable for controlling the primary power sources and the secondary power source to provide power to the system load simultaneously. In one embodiment, the power management unit is further operable for adjusting power of each of the primary power sources according to the power requirement of the system load. Therefore, the system load can be provided with desired power and can be freed from power interruption.

Furthermore, the power management unit is operable for selectively directing power of each of the primary power sources to the secondary power source, which allows the secondary power source to be charged in different charging phases/modes.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A method for managing power of an electronic system, comprising:
   converting voltages of a plurality of fuel cells to a plurality of output voltages respectively by a plurality of DC/DC converters;
   monitoring output currents of said DC/DC converters respectively;
   sequentially turning on a plurality of switches to direct power of a corresponding DC/DC converter to a load according to a power requirement of said load;
   directing power of said corresponding DC/DC converter to charge a battery pack;
   adjusting power of said corresponding DC/DC converter according to said power requirement of said load and a charging power requirement of said battery pack;
   directing power of said battery pack to said load if said power requirement of said load exceeds a total power capacity of said plurality of DC/DC converters; and
   monitoring a charging current and a discharging current of said battery pack.

2. The method as claimed in claim 1, further comprising:
   receiving a control signal indicating the number of battery cells in said battery pack.

3. An electronic system comprising:
   a plurality of fuel cells;
   a plurality of DC/DC converters coupled to said plurality of fuel cells respectively and operable for converting voltages of said fuel cells to a plurality of output voltages respectively;
   a plurality of sensors coupled to said DC/DC converters and operable for monitoring output currents of said DC/DC converters respectively;
   a plurality of switches coupled to said DC/DC converters respectively; and
   a plurality of power management controllers coupled to said DC/DC converters via said switches respectively and operable for sequentially turning on said switches to direct power of a corresponding DC/DC converter to said load according to a power requirement of said load, for directing power of said corresponding DC/DC converter to charge a battery pack, for adjusting power of said corresponding DC/DC converter according to said power requirement of said load and a charging power requirement of said battery pack, and further operable for directing power of said battery pack to said load if said power requirement of said load exceeds a total power capacity of said plurality of DC/DC converters,
   wherein a first power management controller of said plurality of power management controllers is operable for monitoring a charging current and a discharging current of said battery pack.

4. The electronic system as claimed in claim 3, wherein each of said power management controllers receives a control signal indicating the number of battery cells in said battery pack.

* * * * *